April 28, 1964        G. F. GRONDIN        3,131,377

SMALL GAP DATA TAPE COMMUNICATION SYSTEM

Filed Sept. 28, 1959        9 Sheets-Sheet 3

INVENTOR.
GEORGE F. GRONDIN

BY

ATTORNEYS

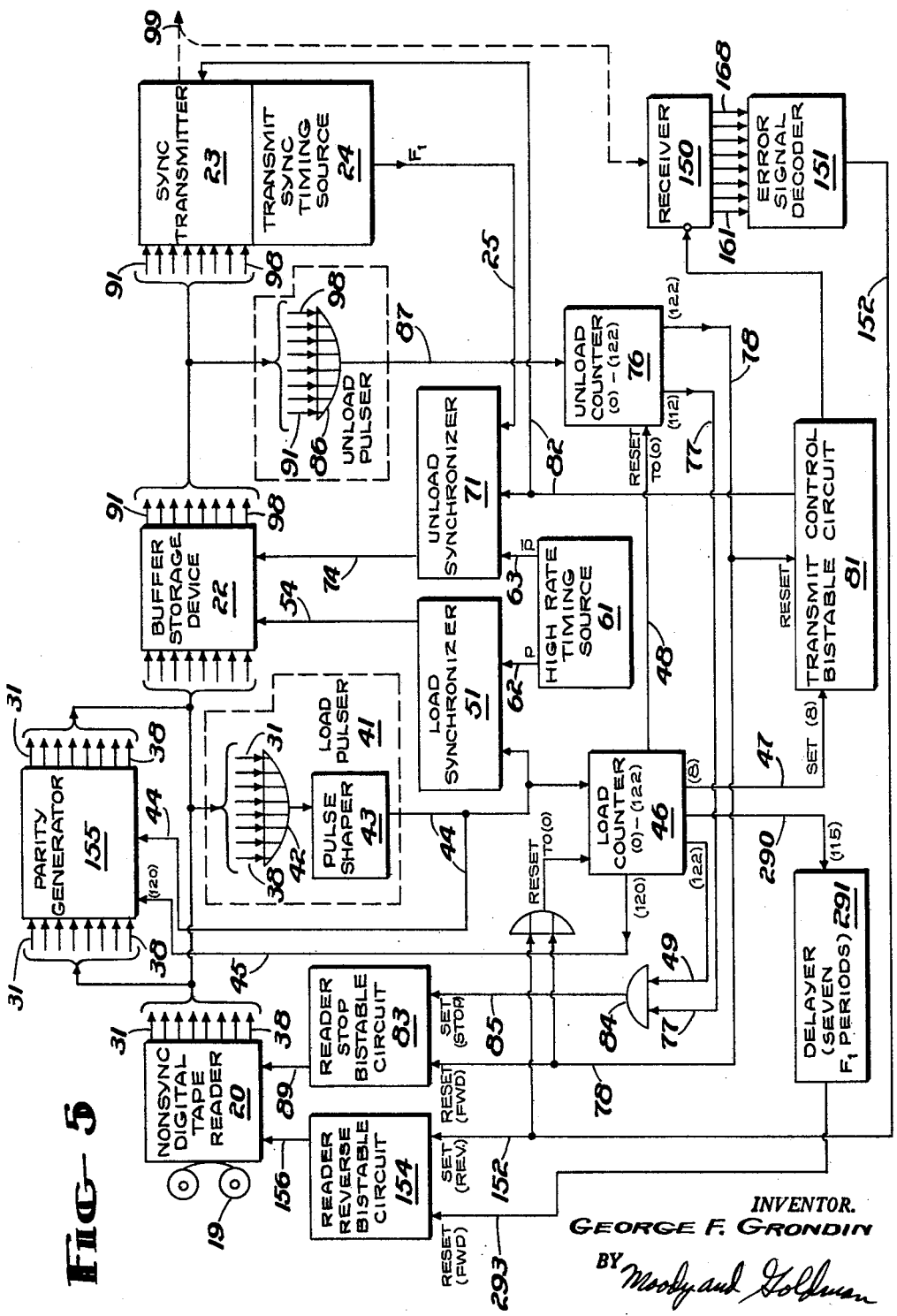

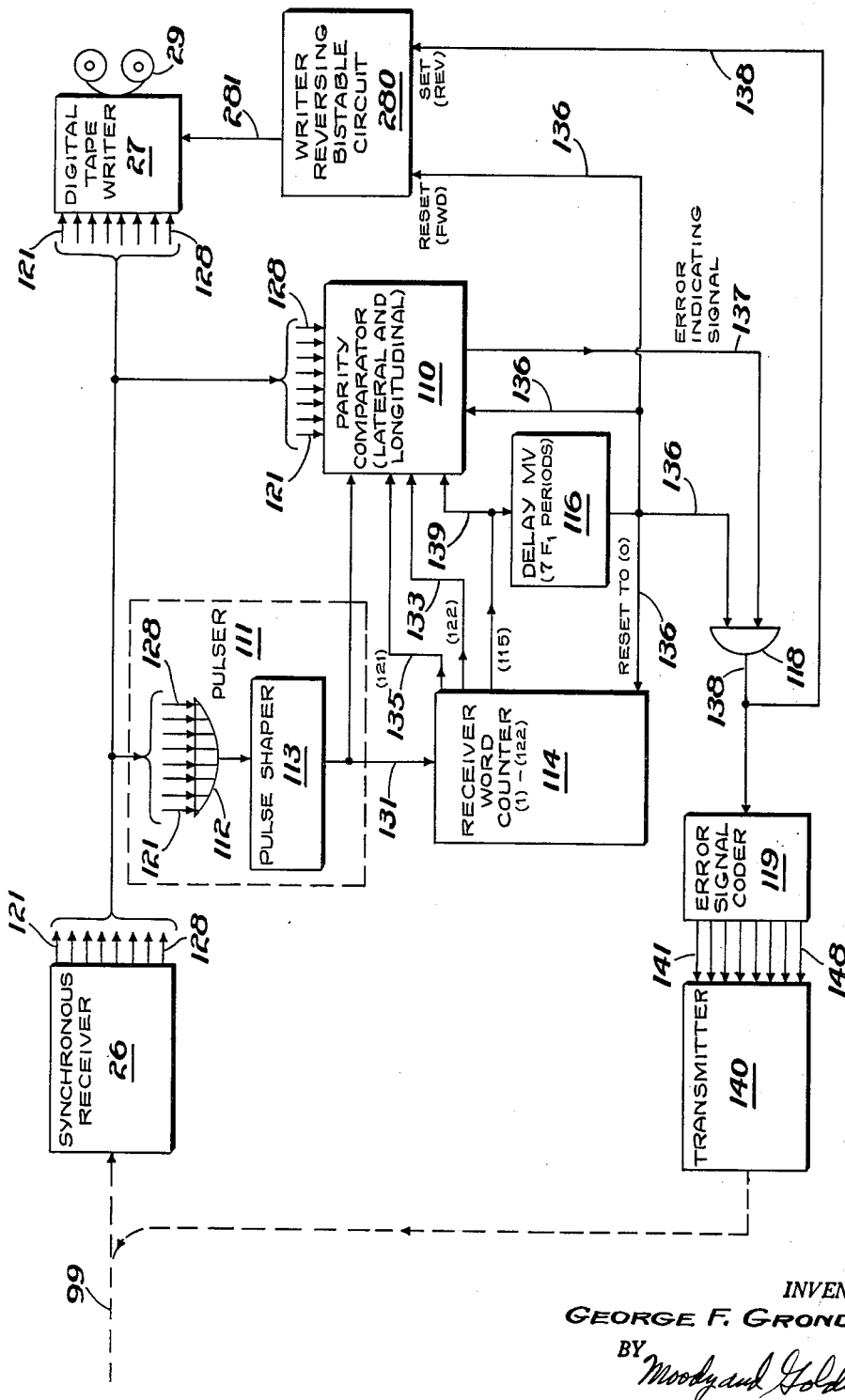

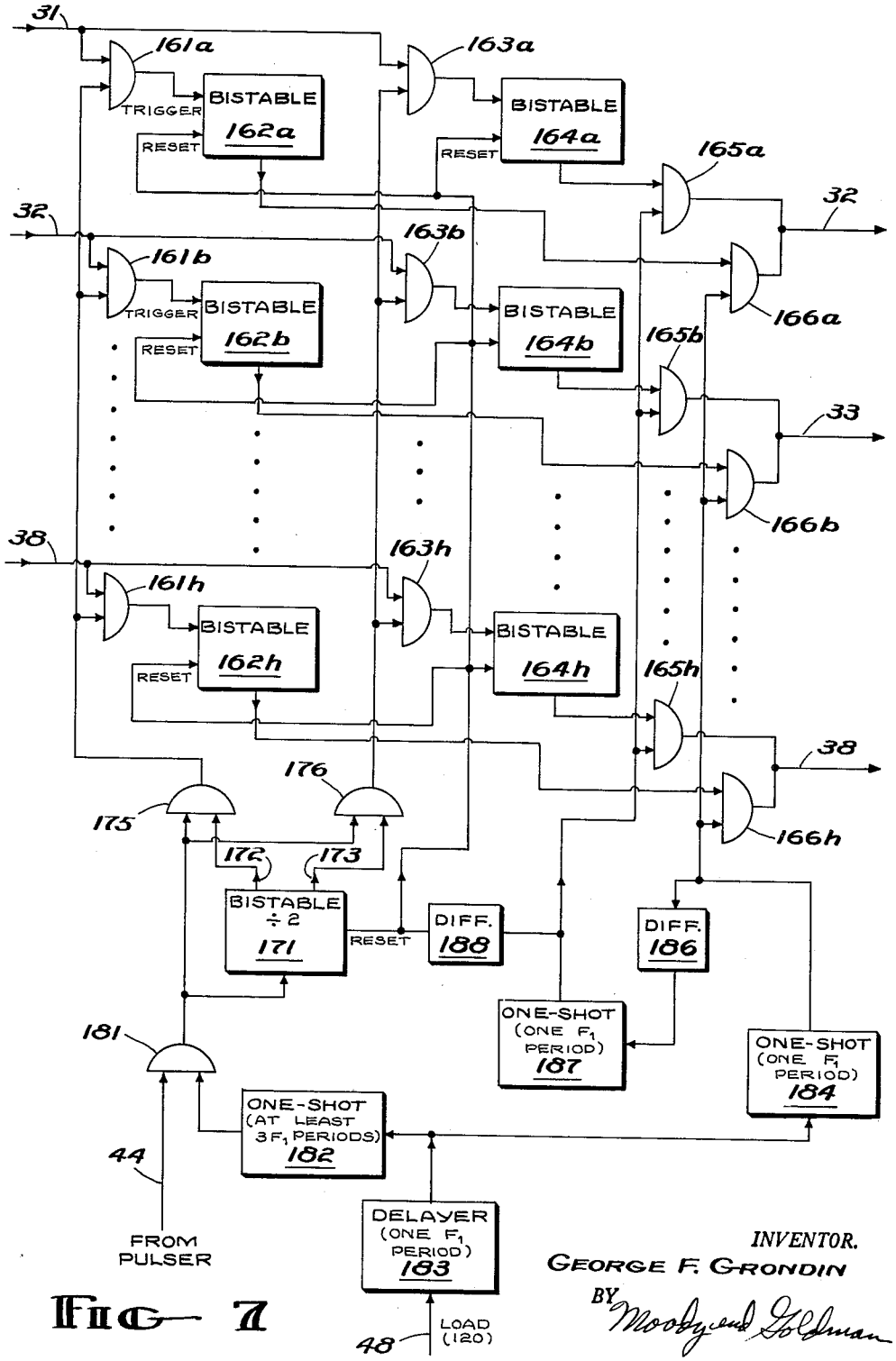

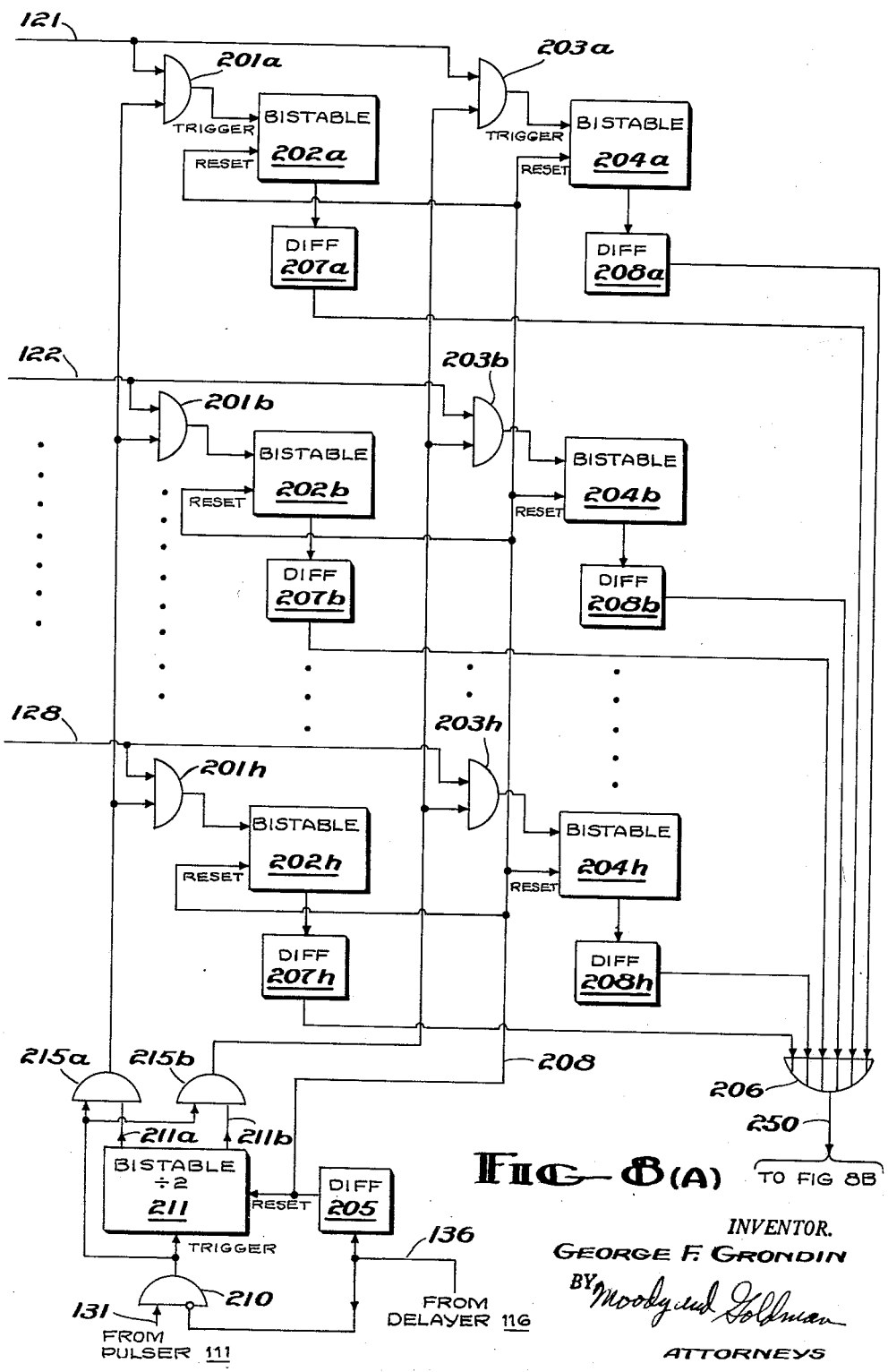

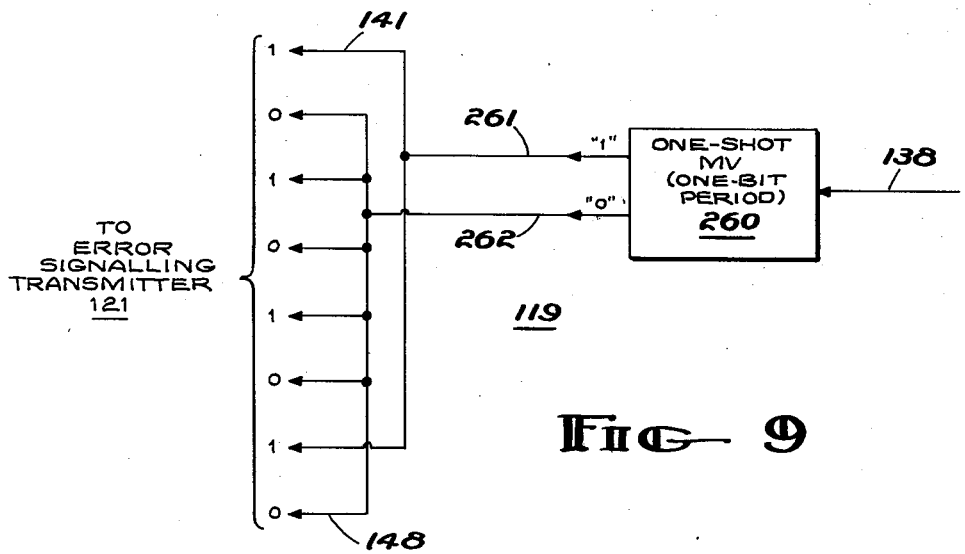
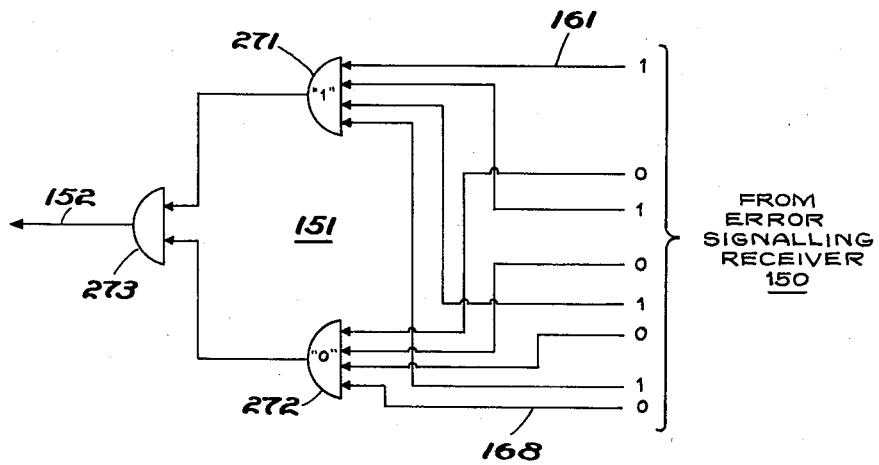

United States Patent Office 3,131,377
Patented Apr. 28, 1964

3,131,377
SMALL GAP DATA TAPE COMMUNICATION
SYSTEM
George F. Grondin, Van Nuys, Calif., assignor to Collins
Radio Company, Cedar Rapids, Iowa, a corporation
of Iowa
Filed Sept. 28, 1959, Ser. No. 842,709
19 Claims. (Cl. 340—172.5)

This invention relates to adapting nonsynchronous binary tape readers and writers to a synchronous communication system. The invention is particularly related to the transmission of magnetic or perforated tape binary data arranged in a format having blocks of data separated by relatively small gaps. An example of such format is a block cycle period nominally being 90% occupied by a data block and 10% by a following spacer gap.

The term "reader" is used herein to include devices that sense recorded binary-magnetization changes to produce corresponding impulses. Likewise, the term "writer" includes devices capable of recording such impulses on a magnetic material.

The invention operates a reader in its normal nonsynchronous mode. Presently available readers vary in their data rate between maximum and minimum values, which depend upon such variable factors as bit packing of recorded magnetic tape, input voltage changes, instabilities of component parts, etc. As a result, their read rates vary by about 10% about stated nominal rates.

It is, therefore, a principal object of this invention to provide means for converting data nonsynchronously read from magnetic tape for transmission by a synchronous communication system.

It is another object of this invention to provide a communication system for binary magnetic tape having automatic error correction.

It is still another object of this invention to provide a magnetic tape binary communication system that does not require an error-correcting parity system, but requires only an error-detecting parity system to permit automatic correction of errors.

A bit-synchronous communication system that may be used with the invention is described and claimed in Patent No. 2,905,812 issued September 22, 1959, by Melvin L. Doelz et al., titled, "High Information Capacity Phase-Pulse Multiplex System," assigned to the same assignee as the present invention.

Primary advantages of a bit-synchronous communication system are greater economy of bandwidth, and a better signal-to-noise ratio than are obtainable with a bit-nonsynchronous communication system under the same transmission conditions. For example, a voice quality telephone line can have its data information capacity approximately doubled by utilizing a synchronous communication system. However, most important to many types of data communications is the improvement of received signal-to-noise ratio by a synchronous system over a nonsynchronous system. For example, a single error may invalidate an entire block of binary data, which may contain several hundred bits of information. Hence, a system which minimizes error is mandatory in many situations.

For definition purposes, data is transmitted in the invention as a sequence of data "blocks." Each block consists of a plurality of consecutive "words," in which each work consists of parallel bits of information. The number of parallel bits equals the number of channels on a tape. Each block is followed by a spacer gap, during which no data is transmitted. However, a spacer gap may contain directions between the reader and the writer, and does not result in any written data. In this invention, the spacer gap is relatively small compared to the time of the block that it follows, such as where they have a 90%–10% relationship. This is a format utilized by many types of digital computers having facilities for magnetic tape readin and/or readout.

For example, a block may have a 120 bit length and include eight parallel channels, generally seven of the channels are independent data channels and an eighth channel is a lateral parity channel, in which a "1" or a "0" is provided so that the simultaneously occurring bits in each eight bit "word" always add up to an odd value (or an even value, if desired).

Although the invention operates with bit synchronism during communication, it does not require block synchronism. That is, the invention can tolerate significant variation in its transmitted block rates.

A buffer storage device is provided at the transmitter to account for differences between a nonsynchronous read rate, and the synchronous transmission rate. A short delay period of about half the spacer gap is provided between the beginning of reading a block of data and the beginning of transmission of the same block. The reader is stopped for a short period of time during a spacer gap following a short block having a time length near a minimum tolerance for the reader. Stops are not provided when the block time approaches or exceeds a medium time length.

The synchronously transmitted blocks all have the same length. But the transmitted gaps will vary slightly about a nominal value, because they will be the same as the read gaps, except that for small read gaps, the transmitted gap is extended by the stop time of the reader.

A synchronous receiver receives the transmitted data via a wire or radio link. A digital tape writer is connected to the output of the receiver and is operated directly from the synchronous data.

Automatic error correction is provided by signalling the reader over the same communication medium during a spacer gap following an erroneous block or on an independent channel the reader and writer are automatically backed-up for a retransmission of the erroneous block. The amount of back-up is one or more blocks, depending on the absolute delay for a round-trip communication. This compensates for overshoot into subsequent blocks due to a delayed request for retransmission. The existence of an error is obtained by a parity system providing error detection. In low error rate systems, this arrangement is much more efficient than using error-correction parity which would involve a much greater amount of redundancy.

Further objects, features and advantages of this invention will be apparent to one skilled in the art upon further study of the specification and the accompanying drawings, in which:

FIGURES 1(A)–(G) illustrate timing diagrams used in explaining fundamentals of the invention;

FIGURE 5 shows the reader transmitting portion of the invention given in FIGURE 2, but having an error-correcting feature added;

FIGURE 6 shows an error correcting feature added to the receiving system shown in FIGURE 2;

FIGURE 7 illustrates a detailed form for the parity generator shown in FIGURE 5;

FIGURES 8(A) and (B) illustrate in detail a parity comparator of the type shown in FIGURE 6;

FIGURE 9 illustrates an error signal coder; and

FIGURE 10 shows an error signal decoder.

The drawings will now be considered in regard to a preferred embodiment of the invention.

GENERAL EMBODIMENT

Figure 2:
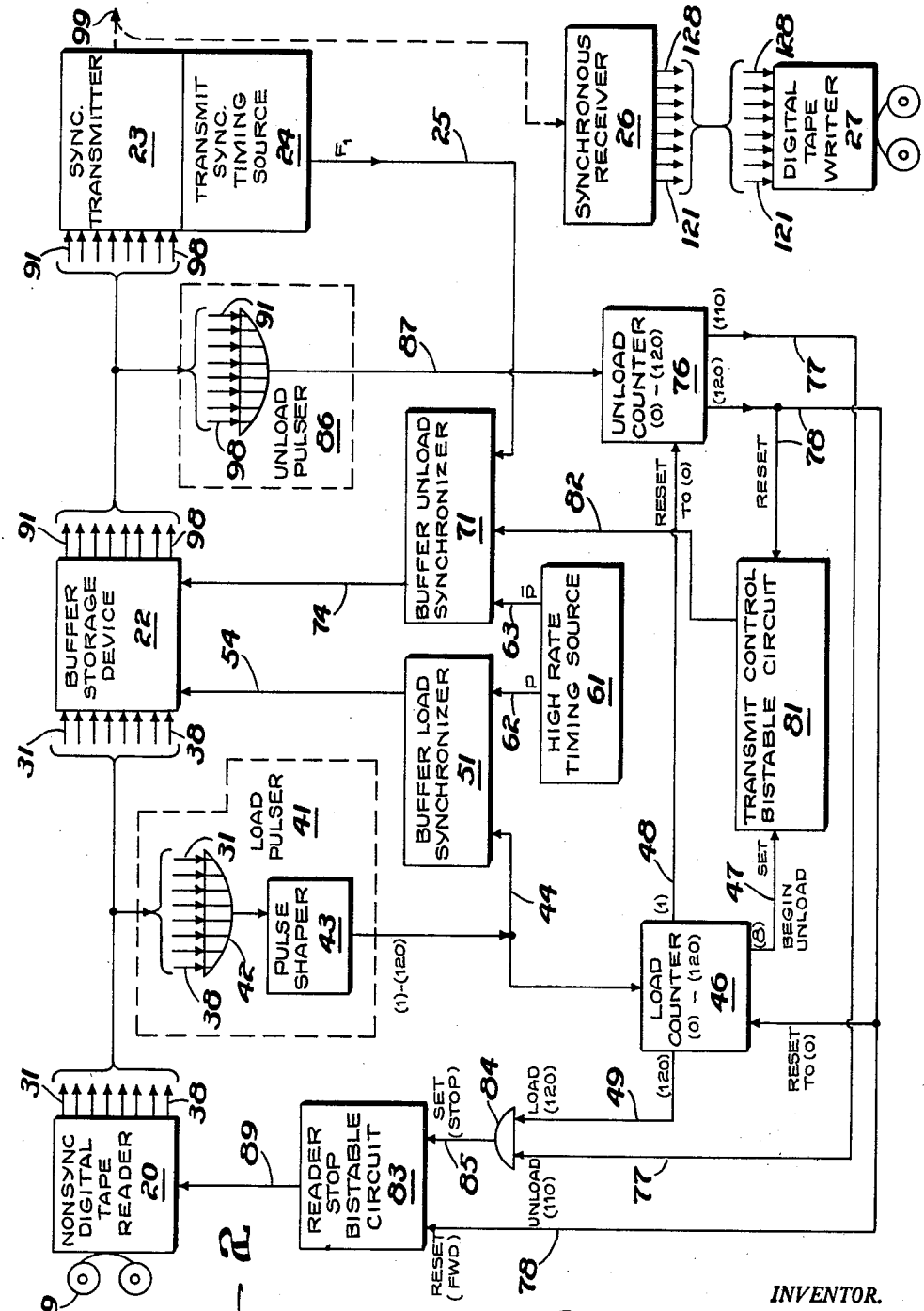
FIGURE 2 shows an embodiment of the invention.

FIGURE 2 illustrates a general embodiment of the invention which does not have automatic error correction. FIGURES 5 and 6 illustrate the same general embodiment with additional features that provide automatic error correction. The embodiment of FIGURE 2 is first explained, and later the error correcting features are added and explained in connection with FIGURES 5 and 6.

Tape Reader 20 and Its Block Cycle

In FIGURE 2, a binary recorded magnetic tape 19 provides an input to the embodiment. The recorded binary data is in block cycles, with 90% of each cycle being a data block, and 10% being a spacer gap following the data. The embodiment also presumes approximately a 10% tolerance in the reading time for block-cycle periods provided from a reader 20, which operates nonsynchronously to read tape 19. Digital tape reader 20 may be a standard tape handler such as Ampex FR–200 or Potter 906 set for reading operation.

The tape has eight parallel channels in which six are independent, a seventh is timing, and the eighth is a redundant channel having lateral parity information for the six independent channels. Each parity bit adds with the simultaneous bits on the six channels to total a binary "1" as a lowest order digit. Each set of eight lateral bits having a parity total is a "word." Each data block has a length of 120 words in this embodiment.

Block Cycle Alteration for Transmission

The nonsynchronous readout of reader 20 is provided by leads 31–38 to the input of a buffer storage device 22. A synchronous readout from buffer storage 22 is timed with $F_1$ pulses derived from a transmitter synchronous timing source 24. Hence, the synchronous readout from buffer storage 22 always provides a data block having a fixed time length that is 120 $F_1$ periods.

Figure 1:
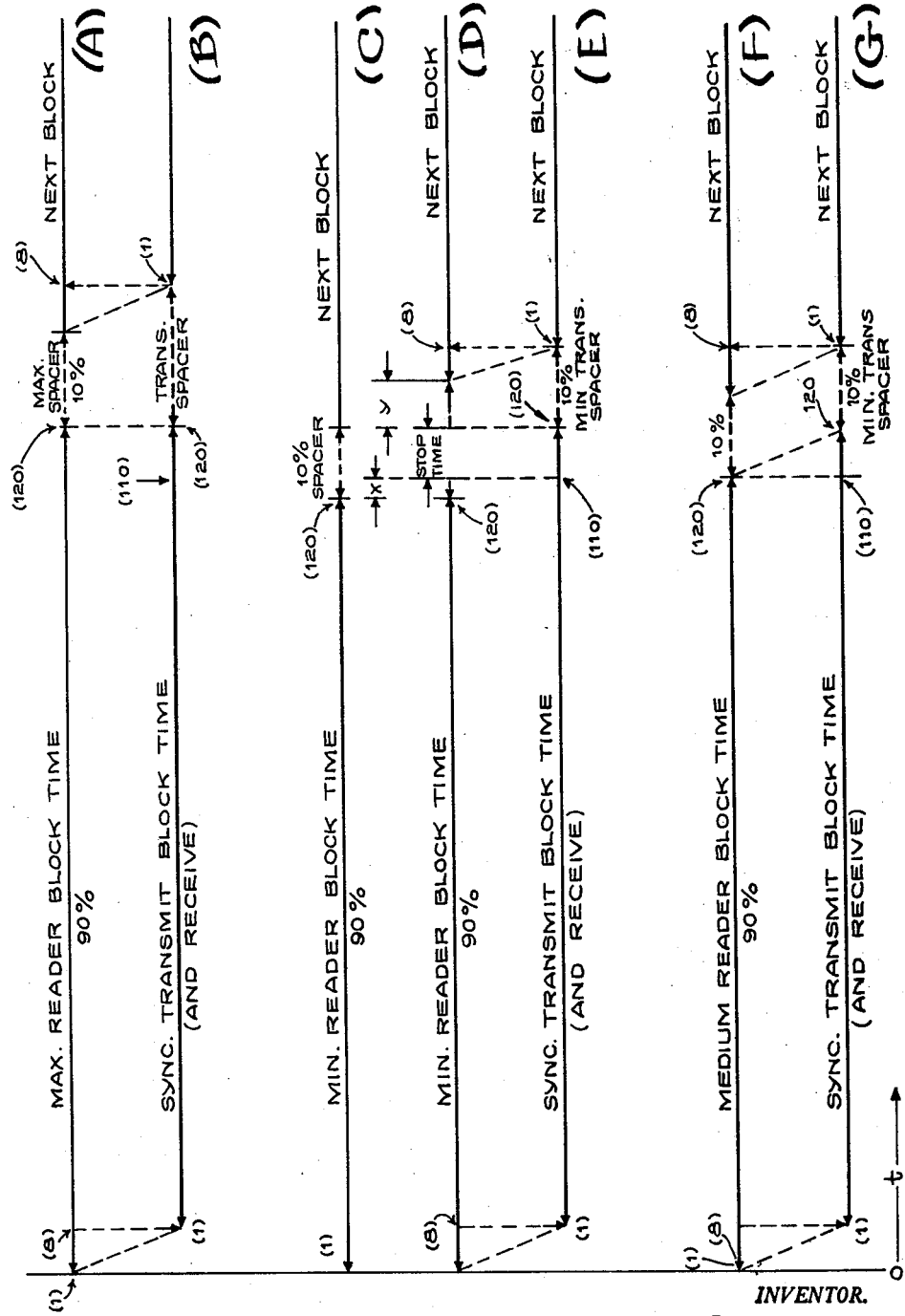

Although the synchronous data blocks always have the same time length, the spacer gap periods that follow them vary somewhat with variations in the reader rate. Variations in block-cycle time into and out of buffer 22 are shown in FIGURES 1(A) through (G). FIGURES 1(B), (E) and (G) illustrate synchronous block-cycle periods unloaded from buffer 22 adjacent to various nonsynchronous cycle periods loaded into buffer 22. The data is unloaded from buffer 22 with synchronous timing for transmission. FIGURE 1(A) shows a maximum loading cycle period, and FIGURE 1(C) illustrates a minimum loading cycle period, wherein there is slightly greater than a 10% difference between them. These maximum and minimum limits are set to maintain the spacer gap of the transmitted data within the limits of 10% to 20% of the transmitted block length. It is presumed that computers using the communicated tape require a minimum gap of 10% but can use longer gaps.

The beginning of an unloading cycle is always delayed beyond the beginning of a loading cycle from the reader. In this embodiment, an initial delay period is provided between the starts of a buffer readin cycle and a readout cycle by starting the readout cycle at the eighth word of the readin cycle. That is, buffer storage device 22 does not begin reading out a synchronous block until the nonsynchronous readin from reader 20 reaches the eighth word of a 120 word block.

A comparison of FIGURES 1(A) and 1(B) illustrates a maximum transmitted spacer gap. The maximum transmission gap is equal to the sum of the gap following a maximum length block from the reader and the delay time between the first and eighth counts of a block.

FIGURE 1(C) illustrates a minimum block and spacer time. When a minimum block occurs, reader 20 is stopped during its following spacer gap for a fixed number of synchronous counts of the transmitted block. In this embodiment, the stop period is taken at the end of a corresponding synchronous block between its counts 110 and 120. The stop period is chosen to make the corresponding transmitted gap time for a minimum block about 10% of the synchronous block time. FIGURE 1(D) shows the relationship between the minimum read block time and the stop period. FIGURE 1(E) relates the minimum read block with its added stop period to the corresponding synchronous transmission cycle.

The minimum size 10% spacer time that is shown as a unit in FIGURE 1(C) is shown in FIGURE 1(D) as split into two parts X and Y by the stop time. In FIGURE 1(E), the transmitted spacer gap is equal to the sum of period Y, and the eight count delay period of the next read block. The longer the stop time is made (by changing count 110 to a lower count) the greater part Y becomes at the expense of part X, and the longer the transmitted gap becomes. In this embodiment, the transmitted gap time for a minimum read block is made about 10% of the transmitted block time; and therefore the stop period is started at a reader count that adjusts period Y accordingly. Of course, the stop period cannot begin before the end of the block being read because it would interfere with it and might cause errors.

In fact, the reader can operate with a block time smaller than the minimum defined above. However, the transmitted gap would become substantially less than 10%, which is considered undesirable in this embodiment; although it may be permissible in some instances. However, the end of the minimum reader gap must occur prior to transmit count (110), because the transmitted gap period then goes to zero.

The stop period is not provided during all gap, but only during those following short reader block times, where the reader block time terminates before count (110) of the corresponding transmitted block. Thus, as the reader block time increases from its minimum value, it reaches a medium length where it terminates slightly after transmitted word count (110); and no stop period is induced for longer reader block times. The transmitted spacer gap will equal the corresponding spacer gap for the medium and larger sized block, as is seen by comparing FIGURES 1(F) and (G). Since the medium size block is slightly longer than the synchronous block, the transmitted spacer is slightly greater than 10% of the transmitted block time. The longest transmitted spacer gap occurs for reader blocks slightly less than the medium length, because the transmitted gap is then equal to the sum of the stop time and the 10% reader gap. This medium length condition is shown in FIGURE 1(F).

Load Pulser 41

The system shown in FIGURE 2 uses the format explained in conection with FIGURES 1(A)–(G). Thus, in FIGURE 2, a load pulser 41 is provided which generates a pulse from each word of a block being read. Basically, the load pulser is an "OR" gate 42, which has eight inputs that respectively connect to the eight channel leads 31—38. Because of the lateral parity channel, it is assured that there will be at least one "1" bit during each word of a block. "OR" gate 42 passes the simultaneous "1" bits as a single output pulse. Hence, one pulse is generated from each of the 120 word periods of a block.

Because there may be slight differences in alignment of simultaneous bits from reader 20, there may be variations in size of pulses provided from "OR" gate 42. Accordingly, a pulse shaper 43 is connected to its output to shape the pulses uniformly. Pulse shaper 43 may be a one-shot multivibrator having a pulse duration of about one-half an $F_1$ cycle.

Buffer Storage Device 22

Buffer 22 may be any type of random-access or sequential storage device having at least an eight word capacity. It is presumed in this embodiment that storage device 22 is an X—Y magnetic core sequential storage unit of the type known in the art.

Loading and unloading of buffer 22 are always done at different times to prevent interference between them. They are controlled by a pair of outputs from a high rate timing source 61. Source 61 provides interleaved output pulses P and $\overline{P}$ on leads 62 and 63. The pulses might have a rate greater than ten times the $F_1$ pulse rate. The output pulses have a short duty cycle; and pulses $\overline{P}$ occur mid-way between pulses P so that there can never be any time coincidence between them. Each loading operation is done at the time of a pulse P, and each unloading operation is done at the time of a pulse $\overline{P}$. Accordingly, they must occur at different times.

Buffer Load Synchronizer 51

Load synchronizer 51 chooses particular pulses P to control the loading operation. Load pulser 41 determines when pulses P should be selected. Each pulse from pulser 41 is provided on a lead 44 to load synchronizer 51. After each pulser pulse, synchronizer 51 provides one P pulse to the buffer on a lead 54 to control the loading of a word into the buffer.

Figure 3:
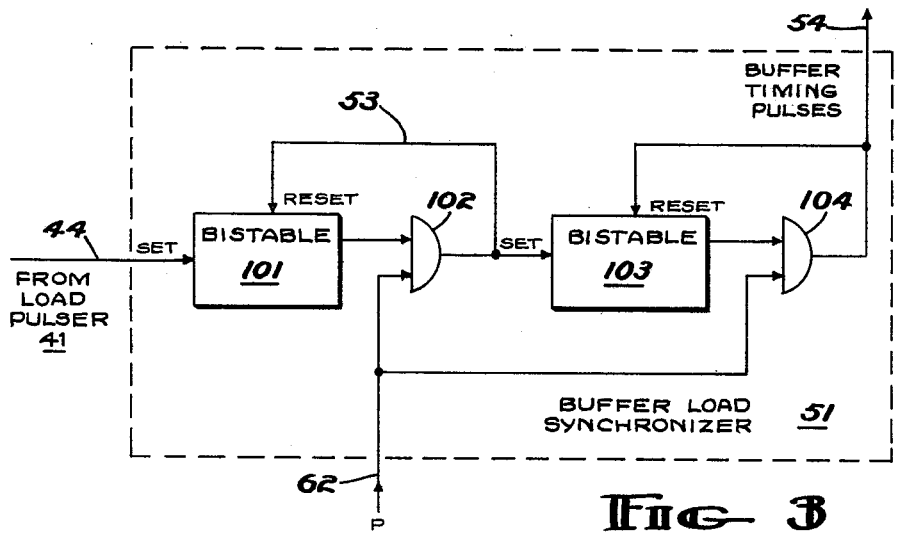
FIGURE 3 is a more detailed diagram of a buffer load synchronizer used in FIGURE 2.

FIGURE 3 illustrates a detailed form for synchronizer 51. It includes a first bistable circuit 101, which might be a flip-flop. It has a set input connected to lead 44 to receive the pulses from pulser 41. Each pulse sets bistable 101 so that an output enables an "and" gate 102. Another input of gate 102 is connected to lead 62 to receive the P pulses from source 61. Thus, as soon as gate 102 is enabled in response to a word being available from the reader, the very next P pulse passes through gate 102 to lead 53 and resets bistable 101. This disables gate 102 so that only one P pulse passes through it in response to one word being available from the reader.

Still further, the P pulse passed by gate 102 sets another bistable circuit 103, and its output enables another "and" gate 104. Lead 62 is also connected to an input of gate 104. Hence, when gate 104 is enabled, in response to a first P pulse, the very next P pulse passes through gate 104 to lead 54 and resets bistable 103 to disable gate 104 and prevent passage of any further P pulses. The pulse passed by gate 104 goes to buffer 22 to load the word available from the reader. A better formed buffer timing pulse is obtained by using the second P pulse rather than the first.

Load Counter 46

Counter 46 is provided to time the operations of the system as they relate to the loading operation. The timing operations are the eight count initial delay for the synchronous buffer unload operation and the stop operation for the reader which may be required after load count (120).

Counter 46 may be a conventional type capable of counting from (0) to (120). It has three outputs provided on leads 47, 48 and 49. Lead 47 provides count (8). Lead 48 provides count (1), which is used to reset an unload counter 76. Lead 49 provides last load count (120).

Counter 46 remains at count (120) until it is reset to (0) by a last pulse indicating when the block has been unloaded from the buffer. The reset pulse is provided on lead 78 from an unload counter 76 which is described later.

Transmit Control Bistable Circuit 81

As stated above, the buffer unload operation is started by load count (8) provided on lead 47, which provides a setting input to bistable circuit 81. Whenever circuit 81 is triggered from lead 47, it provides an output on a lead 82 to a buffer unload synchronizer 71, that signals synchronizer 71 that it should begin synchronously unloading data from buffer 22. A reset input 78 of circuit 81 is signalled at the end of the block being synchronously unloaded.

Buffer Unload Synchronizer 71

Thus, when synchronizer 71 receives an enabling signal from transmit control bistable 81, unload pulses are provided to the buffer on a lead 73 in synchronism with the $F_1$ pulses. The first $\overline{P}$ pulse occurring after the start of each $F_1$ pulse is provided on lead 73 to insure proper passage of the next $\overline{P}$ pulse for the buffer unloading. Hence, the 120 consecutive $F_1$ pulses unload an entire block on leads 91—98 from buffer storage device 22.

Figure 4:
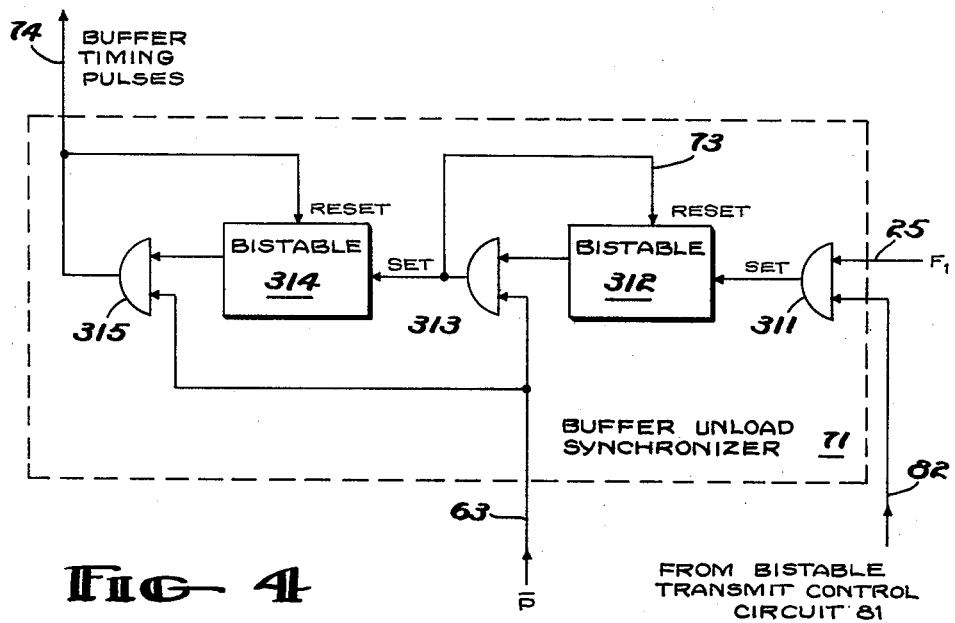
FIGURE 4 is a detail of a buffer unload synchronizer used in FIGURE 2.

FIGURE 4 illustrates a detailed form of unload synchronizer 71. It is very similar to load synchronizer 51, except that unload synchronizer 71 is responsive to the enablement and disablement of transmit control bistable circuit 81, which has its output provided on lead 82. A first "and" gate 311 in synchronizer 71 has an input connected to lead 82. Another input is connected to lead 25 to receive $F_1$ pulses from timing source 24. Accordingly, gate 311 can pass $F_1$ pulses only while control circuit 81 is enabled.

An $F_1$ pulse passing through gate 311 sets a bistable circuit 112. When set, its output enables an "and" gate 313, which receives $\overline{P}$ pulses from lead 63. The first $\overline{P}$ pulse occurring after gate 313 is enabled, passes through it to a lead 73 to reset bistable circuit 312. Upon being reset, "and" gate 313 is disabled so that only one $\overline{P}$ pulse was passed.

Furthermore, the $\overline{P}$ pulse passed by gate 313 sets a bistable circuit 314. When set, it enables an "and" gate 315. Another input to gate 315 is connected to lead 63 to receive $\overline{P}$ pulses. The first $\overline{P}$ pulse occurring after enablement of gate 315 passes through it to lead 74 and resets bistable 314. Upon being reset, no further $\overline{P}$ pulse passes through gate 315. Accordingly, in response to each $F_1$ pulse occurring when circuit 81 is enabled, a $\overline{P}$ pulse is provided to lead 74 to unload a word.

Synchronous Transmitter 23

Transmitter 23 may be any synchronous type for transmitting binary data. The type described in patent application No. 502,045 cited above is particularly well suited. Leads 91–98 provide inputs to synchronous transmitter 23. Transmitter 23 must have a data capacity determined by the maximum rate of operation of reader 20. Accordingly, it might have any number of channels, and a corresponding $F_1$ rate, with means for converting the data to the required number channels. However, in this embodiment it is presumed that transmitter 23 has eight channels, one for each lead 91–98.

Output 82 of transmit control bistable circuit 81 is connected to transmitter 23 so that it can be disabled during spacer gaps. Then the medium 99 can be used for other communications such as an answer back from the writing terminal to signal an error or other message.

Unload Pulser 86

Pulser 86 has inputs connected to leads 91–98 to provide one pulse for each word unloaded from storage device 22. Pulser 86 is an "OR" gate of the same type as gate 42 in load pulser 41. However, a pulse shaper is not needed with unload pulser 86, because the coincidence of its inputs is assured by the unload operation of synchronizer 71.

Unload Counter 76

Counter 76 may be conventional and of the same type as counter 46. It counts from (0) through (120). Counter 76 receives an output 87 from unload pulser 86. It is reset to count (0) with count (1) from load counter 46 on lead 48.

A pair of outputs are provided on leads 77 and 78 from counter 76. Lead 77 indicates unload count (110), which can be used for starting a stop period for reader 20; and lead 78 indicates count (120) which is the end of a stop period and the transmitted block. Furthermore, count (120) provides a reset input of bistable circuit 81 to terminate the unload signal on its lead 82 to stop the unloading operation of synchronizer 71. Hence, when count (120) is reached, no further words are provided. Thus, counter 76 remains at count (120) until a reset pulse is received from counter 46.

*Reader Stop Bistable Circuit 83*

As explained in connection with FIGURE 1(D), a stop period may be provided during spacer gaps of short blocks that occur when the reader is operating near its fastest rate. Under such conditions, reader stop bistable circuit 83 generates a stop signal during the following spacer gap. A lead 85 provides the stop signal when circuit 83 is triggered at its set input. The stop signal ceases when a trigger pulse is provided at a reset input.

An "and" gate 84 has its output 85 connected to the set input of bistable 83. Gate 84 has a pair of inputs which connect to leads 49 and 77. Thus, whenever a reader block is completed before its corresponding transmitted block reaches count (110), load counter 46 provides an output count (120), which exists from the end of the loaded block to the end of the transmitted block. Load count (120) enables gate 84 during its existence. If unload count (110) occurs on lead 77, during the existence of load count 120 on lead 77, an output pulse is provided from gate 84 to set bistable circuit 83. It therefore provides a stop output to the reader until reset. It is reset when the unloaded block is completed, which is signalled by count 120 on lead 78 to terminate the stop period and permit reader 20 to again continue in its forward reading direction. Hence, the stop signal exists in the gap after a short reader block between unload counts (110) and (120).

*Synchronous Receiver 26*

Receiver 26 receives information being transmitted by transmitter 23 via either radio link, telephone, wire, etc.

Receiver 26 may be any type capable of detecting the synchronous information being transmitted. A pilot tone, modulated at the $F_1$ rate may also be transmitted to establish synchronism between the receiver and transmitter. A receiver, as described in the above-cited patent application No. 502,045 is preferable. Outputs from receiver 26 are provided on leads 121 through 128, and they have the same form as provided from buffer 22 on leads 91-98.

A lateral parity checker may be included with receiver 26 to give an indication of a received error.

*Digital Tape Writer 27*

A digital tape writer 27 has eight channels connected directly to the outputs of receiver 26 on leads 121-128 and writes the information at the synchronous received rate. Writer 27 is a standard digital tape handler, such as Ampex FR-200 or Potter 906 set for writing operations.

AUTOMATIC ERROR CORRECTION SYSTEM

FIGURES 5 through 10 illustrate the previously described embodiment with additional features which provide automatic error correction. All that is changed is that counters 46 and 76 in FIGURE 5 count from (0) to (122) instead of (0) to (120) and counts (112) and (122) are used for signalling instead of counts (110) and (120). A form of error correcting system follows:

*Transmitter Parity Generator 155*

A parity generator 155 in FIGURE 5 is connected to output leads 31-38 of reader 20. It generates a pair of longitudinal parity words, which immediately follow the words in each channel block. Thus, there will be 120 words in a block provided by tape 19. The first parity word provides the 121st word of the block, and the second parity bit provides the 122nd word to the block. The first parity word comprises eight bits, each being the least significant digit in a summation of all of the odd numbered bits in one of the channels of the block. Likewise, the second parity word comprises eight bits, each being the least significant digit in a summation of all the even numbered bits in one of the channels of the block. The parity words thus appear as the last two counts of a block and are handled like other words by storage device 22, and by transmitter 23.

The outputs of parity generator 155 are also connected to leads 31-38 to provide the added parity words. There is no conflict on leads 31-38 because the parity words are added when there is no output being provided from reader 20.

As previously stated, a lateral parity check is recorded upon tape 19 as its channel eight prior to the tape being inserted into tape reader 20. Hence, a lateral parity check is at all times being transmitted and no parity generator is needed in the embodiment to obtain it.

FIGURE 7 illustrates a detailed form of parity generator 155. It includes a one-shot multivibrator delayer 183. An input to delayer 183 is connected to lead 48 to receive load count (120) from counter 46. Delayer 183 provides a delay greater than the longest bit period that can be expected from the reader, so that the delayed pulse is certain to follow the last data bit in a block being read. In this manner, count (120) signals the longitudinal parity generator that it should unload its odd and even parity bits as two counts following a reader block.

A one-shot 184 is connected to the output of delayer 183. One-shot 184 has a pulse duration of about one $F_1$ period. Consequently, one-shot 184 provides an output pulse corresponding to the 121st bit period of a block.

The termination of a pulse from one-shot 184 determines when the second parity bit should be unloaded. A differentiator 186 is connected to the output of one-shot 184 and provides a pulse corresponding to the trailing edge of the one-shot output. The differentiator pulse triggers a one-shot 187, which provides an output for about one $F_1$ period. Thus, the output of one-shot 187 corresponds to the 122nd count of a block.

The respective selection of odd and even numbered bits is done by using a bistable circuit 171 connected to divide by two. Its input receives word pulses from pulser 41. Because of the divide by two action, its output responds to every other word pulse. An inhibiting "and" gate 181 connects pulser output lead 44 to the input of bistable divider 171. Gate 181 passes the pulser outputs corresponding to the 120 recorded words. But it inhibits any pulser actuations by the longitudinal parity words, since they do not have lateral parity and may not generate a pulse in the pulser. The inhibiting action is provided by a one-shot 182, which is triggered by load count (120) from lead 48. One-shot 182 provides a pulse with a duration of at least three $F_1$ periods to assure that gate 181 is inhibited until at least the end of the second longitudinal parity word.

A pair of opposite-phased outputs 172 and 173 are provided from divider 171. The outputs are received by respective "and" gates 175 and 176. Each gate has another input connected to the output of "and" gate 181 to receive the word pulses. Due to the divide by two characteristic of outputs 172 and 173, gates 175 and 176 are enabled for alternate word pulses.

By resetting the bistable circuit so that gate 175 is enabled and gate 176 disabled at the first word of a block, gate 175 will pass only word pulses corresponding to odd numbered words of a block, and gate 176 will pass pulses corresponding to even numbered words. Bistable 171 is reset in this manner by the trailing edge of each pulse from one-shot 187, and accordingly is reset at the beginning of a spacer gap to await the first word of the next block. Thus, its reset input is connected through a differentiating circuit 188 to the output of one-shot 187.

The summation of odd-numbered bits of a channel is accomplished by one of the bistable circuits 162a–h to provide the odd-parity bits. The summation of even-numbered bits of a channel is accomplished by one of bistable circuits 164a–h to provide the even parity bits.

A group of "and" gates 161a–h have respective inputs connected to reader output leads 31–38. Another input of each of these "and" gates is connected to the output of "and" gate 175 so that they are enabled only during odd-numbered words. The outputs of "and" gates 161a–h are connected to respective trigger inputs of bistable circuits 162a–h.

In a similar manner, another set of "and" gates 163a–h have respective inputs connected to reader output leads 31–38; and each gate has another input connected to the output of "and" gate 176, so that they are enabled only during even-numbered words. Accordingly, outputs of gates 163a–h are respectively connected to trigger inputs of bistables 164a–h. All of bistables 162a–h and 164a–h are reset to a "1" state prior to a block being read by having their reset inputs connected to the output of differentiating circuit 188.

After a block is read, bistable 162a–h will contain summations of odd-numbered bits to provide the first parity word; and bistable 164a–h will contain summations of even-numbered bits to provide the second parity word. In response to the output of one-shot 187, at the time of the first longitudinal parity word, the settings of bistables 162a–h are sampled through a plurality of "and" gates 166a–h, which are enabled then by the output of one-shot 187. In a like manner, another set of "and" gates 165a–h sample the respective settings of bistable 164a–h during enablement by the output of one-shot 187 to pass the second parity word.

*Receiver Error Indication*

In the data receiver part of the error correcting system shown in FIGURE 6, a parity comparator 110 is provided to detect errors in a received block to indicate whether error correction is needed.

Comparator 110 provides two types of parity checks. One is a lateral check using the parity bits of the eighth channel; and the other is a longitudinal check using the parity words comprising the 121st and 122nd counts of a block.

In order for comparator 110 to be aware of the reception of the respective words of a block, a receiver pulser 111 is provided which is constructed in the same manner as pulser 41 at the transmitter. Thus, pulser 111 includes an "OR" gate 112 having inputs connected to receive output leads 121–128. A pulse shaper 113 is connected to the output of gate 112 to assure uniformity of the pulser output provided to a lead 131. Each word pulse is used for the lateral parity check, and therefore comparator 110 has an input connected to lead 131.

A receiver word counter 114 is connected to the pulser output to count the words in a block. Counter 114 may be conventional and capable of counting from (0) to (122). At the end of a received block, a reset signal is provided from comparator 110 to counter 114 on a lead 136 to reset it to "0" to prepare it for reception of the next block. Furthermore, the comparator has inputs connected to leads 135 and 133 which provide counts (121) and (122) for the longitudinal parity check.

*Longitudinal Parity Comparator*

The longitudinal parity check at the receiver is done by part of the circuitry shown in FIGURE 8(A), which includes a set of bistables 202a–h and 204a–h which are connected in a system that is in substance a reverse situation from the longitudinal parity generator in FIGURE 7. A bistable circuit 211 is connected to divide by two the received word pulses on lead 131. Its input is connected through a normally-enabled "and" gate 210 to receive pulser 111. Divider 211 provides two outputs 211a and b, which are opposite in phase at ½ the rate of the received pulses.

A pair of "and" gates 211a and b have inputs connected to the opposite outputs, and have other inputs connected to gate 210. Thus, they pass alternate word pulses. A reset input is provided so that bistable 211 is always reset to the same way at the beginning of a block, which causes gate 215a to be enabled and gate 215b to be disabled.

The alternate bit selection feature uses a set of "and" gates 201a–h that are enabled during odd words, and a set of "and" gates 203a–h which are enabled during even words of a block. Hence, each gate 201a–h has an input connected to the output of gate 215a, and each gate 203a–h each has an input connected to the output of gate 215b.

The bistable circuits are all reset to "0" output state prior to reception of a block, and they are maintained with a "0" reset by the output of differentiator 205 on lead 208 prior to each following block.

Accordingly, each of bistable circuits 202 or 204 should receive 61 bits of information, wherein the last bit is a transmitted longitudinal parity bit. This last bit should assure that its bistable is in a zero output state, if there were no errors.

However, if an error existed in the received information, the bistable circuit receiving the error will have its output in a "1" state.

Delayer 212 is triggered by count (115) received from lead 139 of counter 114. Count (115) is used because errors may prevent the counter from reaching (122). Thus, over a seven $F_1$ period, delay is provided for delayer 212, so that bistables 202 and 204 cannot be reset until after the longitudinal parity words are normally received. All bistable circuits receiving error free information will already be at the reset state and accordingly will not have their output changed. On the other hand, those bistables which received an error will have their output state changed by being reset. The error indicating change is sensed by a pulse from any of differentiation circuits 207a–h or 208a–h respectively connected to the outputs of the bistable circuits. Any differentiated error indicating pulse will pass through an "OR" gate to an output lead 250.

A bistable circuit 251 has a set input connected to lead 250, and is set to an error indicating output by an error indicating pulse from the 250.

*Lateral Parity Comparator*

Figure 8B:
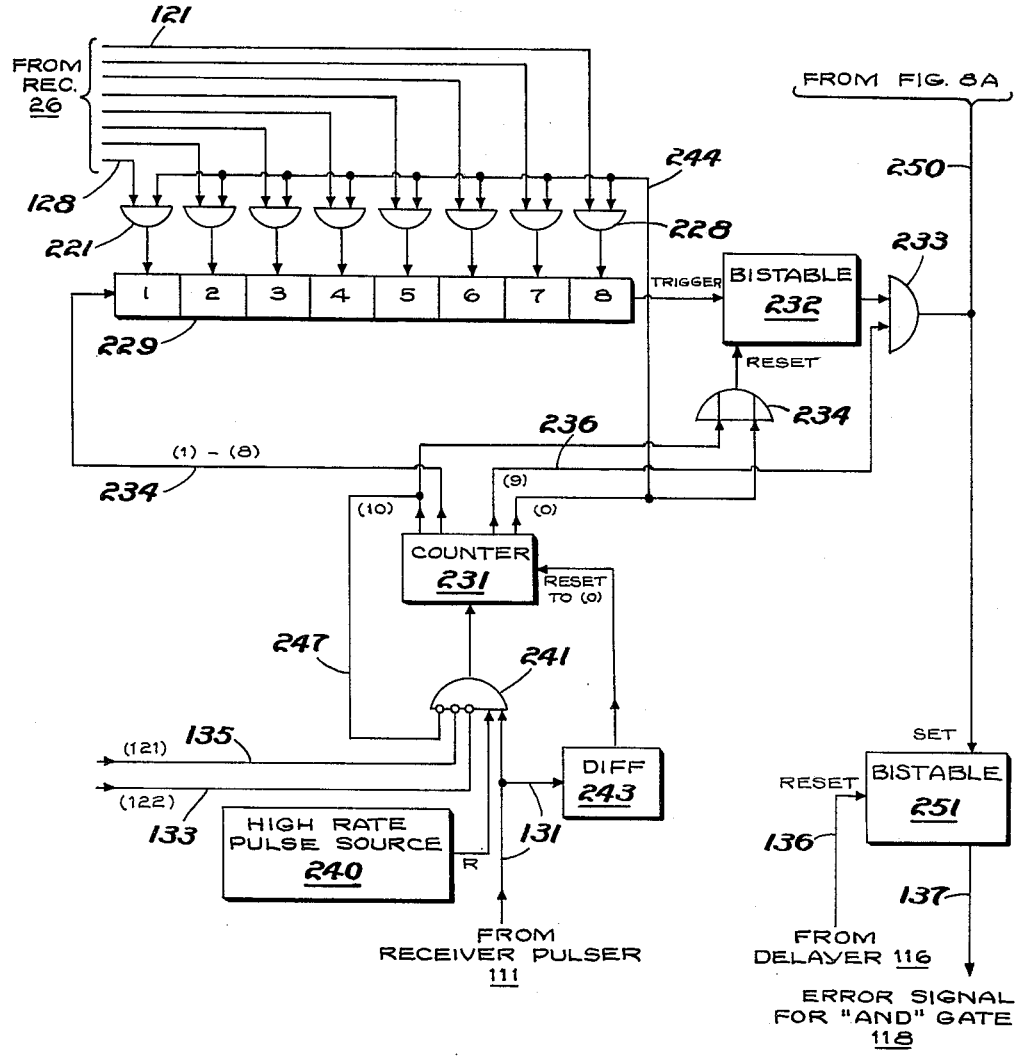

A lateral parity check of each of the 120 data words of a block is accomplished by a shift-register system, shown in FIGURE 8(B), in which a plurality of "and" gates 221–228 have inputs respectively connected to receiver output leads 121–128. Another input to each gate times a simultaneous loading of a word into the shift register. The outputs of gates 221–228 are respectively connected to a loading input of the eight bistable sections of a shift register 229. The bits of a loaded word are serially shifted out of the register 229 very quickly before a next word can be received.

A counter 231 controls the input and output operation of register 229 and is capable of counting from (0) through (10). It is reset to (0) in response to the leading edge of a word pulse from pulser 111 provided through a differentiation circuit 243.

Each pulse from pulser 111 has a duration of about ¼ of an $F_1$ period. Triggering pulses for counter 231 are provided from a high rate pulse source 240, which has a rate that can provide at least nine pulses R in the duration of a single pulse from pulser 111. Hence, every time a word pulse is received, counter 231 is reset to (0), and a sequence of at least nine "OR" pulses pass through an "and" gate 241 to trigger counter 231 up to count (10). An output lead 247 provides count (10) as an inhibiting input to gate 241; and thus, the counter cannot go beyond this count, regardless of excess R pulses, until the next word pulse is received from pulser 111 to reset counter 231 to "0."

The lateral parity check is made with each of the 120 block words; but is not made on the two following longitudinal parity words, since they are not computed with respect to lateral parity. Hence, counts (121) and (122) are provided on leads 135 and 133 from counter 114 to inhibiting inputs of "and" gate 241, so that its operation cannot pass any pulser output during the longitudinal parity wrods to start the lateral check system which might falsely indicate an error.

A summation of the lateral bits stored in shift register 229 is made by a bistable circuit 232, which has a triggering input connected to the shift-register output. Bistable 232 is initially reset to "1" prior to any summing operation by the pulse on lead 244 through an "OR" gate 234. This corresponds to the (0) count, at which time a word is loaded into the shift-register by operation of gates 221–228.

An error-free word should cause bistable 232 to be triggered by an odd number of "1's" which cause it to have a "0" output state when all data is shifted out of the register after count (8).

On the other hand, if an error has occurred, bistable 232 will be in an opposite state after count (8). The error state is sampled at count (9) on lead 236 from counter 231 by an "and" gate 233 connected to the output of bistable 232. The output of gate 233 is connected to lead 250 so that an error indicating state of bistable 232 sets bistable circuit 251 to store an error indication.

*Error Signalling from Writing Terminal*

Accordingly, bistable circuit 251 may be set to an error indication during reception of a block by the lateral parity check or at the end of a block by the longitudinal parity check. In any case, the writing terminal cannot signal the error back to the reading terminal until transmission of the 122 word block is completed, where the same transmission medium is used for signalling back.

Where long delays are needed to obtain an answerback, the system is backed up for more than one block because of overshoot due to the delay. However in this embodiment a one-block backup is used for simplicity of description. Increasing the counts of counters 46 and 114 for multiple blocks accomplishes this. The long delays are encountered where the communication distance is many thousands of miles.

Thus, error signalling to the reading terminal must await the spacer gap following a block. This is done in FIGURE 6 with an "and" gate 118, and a delay multivibrator 116. Delayer 116 is triggered by count (115) and provides an output pulse after delayer 212 has completed its pulse, so that no further setting of bistable 251 can occur. Thus, delayer 116 may provide a delay period of over seven $F_1$ periods when delayer 212 provides a delay of seven $F_1$ periods.

Furthermore, the output of delayer 116 is provided as a reset pulse to bistable 251 and as a (0) reset for counter 114.

Any error indication from bistable 251 is provided on a lead 137 to an input of gate 118 to enable it. The delayer 116 output is provided on a lead 134 to another input of gate 118. Therefore, the delayed pulse passes through gate 118 to a lead 138 only if an error indication exists. A pulse on lead 138 does two things. It actuates a coder 119 and a local transmitter 140 to signal the reading terminal that the reader should retransmit the erroneous block. And simultaneously, it signals the writer to back up for a rewriting of the block.

*Error Reversing of Writer*

Lead 138 is connected to a set input of a writer reversing bistable circuit 280. Thus, an error indicating pulse on lead 138 causes a reversing signal to writer 27 from the output of bistable circuit 280. Writer 27 continues to back-up the tape until the gap preceding the erroneous block is reached, at which time bistable 280 is reset to reverse the writer to its normal forward movement.

As writer 27 moves in the reverse direction in response to setting of bistable 280, pulses are generated from pulser 111 and provided to counter 114, in exactly the same manner as was done during forward direction of reception. However, counter 114 may not reach count (122) upon the writer reaching the beginning of the erroneous block, because one of the lateral parity words may be in error to cause a pulser output to be skipped; and the longitudinal parity words may not cause a pulser pulse. However, the counter will assuredly reach a count (115) which is provided on a lead 139 to signal when the beginning of the block is reached. However, at count (115) the beginning of the block probably is not reached. But, the pulse on lead 139 triggers a delay one-shot 116 to provide at least a seven $F_1$ period delay. When the delay time has expired, it is assured that the beginning of the block has been passed and that the tape is in the preceeding gap. It is then that delayer 116 provides a pulse on lead 136 that resets bistable circuit 280 to cause the tape direction to change to its normal forward direction of the movement.

An erase head or bias on the record head is provided in the writer so that the tape is always erased just prior to a writing operation. Hence, as the tape moves forward, whatever existed previously on the tape is erased so that as soon as a retransmitted block is received it can be written.

*Error Signal Coder 119 and Transmitter 140*

FIGURE 9 illustrates a detailed version for error signal coder 119 seen in FIGURE 6. It arbitrarily codes an error signalling "word" 10101010. It includes a one-shot multivibrator 260 having a pulse duration of about one period at the $F_1$ rate. When actuated, it provides opposite outputs on leads 261 and 262 to signify the "1" and "0" levels. Eight leads 141–148 are connected to the one-shot outputs in the order specified by the arbitrarily coded word.

A transmitter 140 has inputs connected to leads 141–148 to receive an error coded word. It provides an output signal to medium 99 on the same channels which were used for transmitting the data.

Transmitter 140 may be synchronous and of the same type as transmitter 23 at the opposite terminal. This is advantageous where two-way data tape transmission is provided, such as where a second system as shown in FIGURE 2 is provided, with each terminal having a reader and writer.

However, where the gap time between blocks is substantially longer than an $F_1$ bit period, which is generally the case, transmitter 121 need not be synchronous, and coder 119 need not use more than a single channel. For example, an oscillator burst for several $F_1$ periods could signal an error.

*Error Signal Receiver and Decoder*

Any error signal transmitted during the gap time by transmitter 140 is received by a receiver 150 at the reading terminal shown in FIGURE 5. It detects the error indicating signal 10101010 and provides it on lead 161–168 to an error signal decoder 151.

FIGURE 10 illustrates a detailed form for decoder 151. It has one "and" gate 271 with inputs connected to the leads which receive the "1's" of the error signal. Likewise, a second "and" gate 272 has inputs connected to the other leads which receive the "0's" of an error signal. Hence, whenever such signal is received, both gates 271 and 272 provide output pulses. If some other signal is received, no output will simultaneously be provided from both "and" gates. Another "and" gate 273 senses the simultaneous occurrence of pulses from gates 271 and 272. Accordingly, gate 273 provides an output pulse to a lead 152 only if an error signal has been received.

*Error Reversing of Reader 20*

Tape reader 20 has an input 156 which can reverse its direction of movement. The output of a reader reversing bistable circuit 154 is connected to input 156. Normally, the signal on input 156 does not affect the operation of the reader so that the tape moves in a forward direction, except for short stop periods, which occur during gaps as signalled by reader stop bistable circuit 83.

However, an error indicating pulse on lead 152 triggers a set input of bistable circuit 154. When set, circuit 154 provides a reversing output signal on lead lead 156, which causes tape reader 20 to move in a reverse direction. Its reverse speed may be the same as its forward speed.

Since a reversing signal is received only during a spacer gap, the reverse movement must take the tape through an entire block; wherein it generates pulses in load pulser 41 in the same manner as was done during the forward direction of movement through the block. However, it cannot be assured that counter 46 will reach count (122) for the same reasons that counter 114 in FIGURE 6 might not reach that count when going through a block with an error. Likewise, output count (115) is used to signal the beginning of a block through a delay one-shot 291, which provides the last delay at least seven $F_1$ periods. The delayed pulse from the one-shot is provided on a lead 293 to a reset input of bistable 154. When reset, it changes the reader movement back to its normal forward mode. This change in direction thus occurs in the gap preceding the erroneous block. As the reader moves forward in its normal mode, it rereads the erroneously transmitted block, as if it were a new block. Thus, it is transmitted in the same manner as any other block.

Since the format of operation, as explained in connection with FIGURES 1(A)–(G) assures that there will be a spacer gap of the order of 10% of a transmitted cycle, it is sufficient to permit the error signalling and reversing operations of the reader and writer without interferring with adjacent correctly transmitted blocks.

Where an eighth channel is available, which is common, it may be used for answer-back in the automatic-error-correction system.

The principles of the invention have been described and illustrated in an operative system for the purpose of teaching those skilled in the art how the invention may be performed. Changes in the components, units and assemblies will appeal to those skilled in the art, and it is contemplated that such changes may be employed, but yet fall within the spirit and scope of the claims that are to follow:

I claim:

1. A system for bit-synchronously transmitting digital data recorded on tape being read by a nonsynchronous tape reader, said data recorded in blocks separated by spacer gaps, comprising a synchronous transmitter, a timing source connected to said transmitter to control its bit-synchronous rate, buffer storage means being connected between said reader and said transmitter, means for nonsynchronously loading an output of said reader into said storage means and means for synchronously unloading an output of said storage means into said transmitter, means for automatically sensing short time lengths of said blocks being nonsynchronously read, and means for momentarily stopping said reader during spacer gaps following blocks found to be short by said sensing means.

2. A communication system having the transmitting system defined in claim 1, in which a synchronous receiver receives the transmitted data, and a nonsynchronous digital tape writer receives the synchronous output and writes it directly.

3. A communication system as defined in claim 2 wherein said tape has a parity channel having automatic error correction, comprising parity comparator means connected to said synchronous receiver, error signalling transmission means connected to said parity comparator means to transmit a signal indicating an erroneous transmission means for backing up said writer to a tape position prior to said erroneous block, an error signal receiver located with said synchronous transmitter, means for backing up said reader to a tape position corresponding to that of said writer, and means for beginning a normal forward operation of said reader and writer after said back up operations.

4. A tape error correcting system in claim 3, in which said parity channel is lateral, a longitudinal parity generator connected between said reader and said storage means, said parity comparator means providing both a longitudinal and a lateral parity check, error storing bistable means connected to said comparator means to store errors detected by said parity comparator means, means for sampling said error storing bistable means after each received block, and means connecting said error storing means to said error signalling transmission means.

5. A system as defined in claim 4, comprising delay means for triggering said sampling means during a spacer gap following an erroneously received block, and means for actuating said delay means prior to the termination of said erroneous block.

6. A system for bit-synchronously transmitting digital data recorded on tape, said data being recorded in blocks of bits separated by spacer gaps, comprising a nonsynchronous data tape reader receiving said tape, and providing a corresponding signal output, a synchronous transmitter, buffer storage means connected between said reader and said transmitter, means for loading the nonsynchronous reader signal output into said storage means, a timing source connected to said transmitter and said storage means for unloading data synchronously from said storage means into said transmitter for transmission therefrom, comparator means connected to said storage means, said transmitter, and said tape reader for comparing the time length of each block being read with the time length of each synchronous block being transmitted, said comparator means sensing blocks being read that are shorter than a given time length, means for stopping said tape reader momentarily during spacer gaps following data blocks sensed to be shorter than said given time length.

7. A system for bit-synchronously transmitting digital data recorded on tape, said data recorded in blocks of bits separated by spacer gaps, comprising a nonsynchronous data tape reader for reading said tape. Stop circuit means connected to said reader for interrupting its reading operation, a synchronous transmitter, buffer storage means connected between a signal output of said reader and a signal input of said transmitter, a timing source connected to said transmitter and said buffer storage means for synchronously unloading data from said storage means into said transmitter, means for beginning the synchronous unloading of each block after the beginning of its nonsynchronous reading, means for sensing first and second time points of the synchronously unloaded data, means for sensing the termination of each block being read, means for comparing said termination with said first time point, means connecting said comparing means to said stop circuit means to actuate it when said comparator finds said termination occurs prior to said first time point, said stop circuit means being actuated by said second time point to continue said reader in its reading operation.

8. A system for bit-synchronously transmitting digital data recorded on tape, said data recorded in blocks of bits separated by spacer gaps, comprising a nonsynchronous data tape reader receiving said tape, a stop circuit connected to said reader for interrupting its reading operation, a synchronous transmitter, a buffer storage device connected between a signal output of said reader and a signal input of said transmitter, a timing source connected to said transmitter and said buffer storage means for synchronously unloading data from said storage means into said transmitter, means for automatically measuring a time point from the beginning of each block being read, means for beginning the synchronous unloading of said buffer upon the occurrence of said time point, means for sensing the end of each block being read, means for counting data bits in each block as they are being synchronously unloaded, at least two counts of said counting means being sensed, comparator means connected to said sensing means and said counting means, said comparator means comparing the time occurrence of the end of each block being read with a first of said two counts, means connecting said comparing means to said stop circuit to actuate it to interrupt the reader operation when said comparator finds the end of said block occurring prior to the first count, said stop circuit being deactivated by a second of said two counts to continue normal reader operation.

9. A system as defined in claim 8 for communicating tape data comprising a synchronous data receiver, and a digital tape writer connected to the output of said receiver for recording signals detected by said receiver.

10. A system for bit-synchronously transmitting digital data recorded on plural channels of tape, said data recorded in blocks of words separated by spacer gaps, a word being a set of parallel data bits, comprising a nonsynchronous data tape reader, a synchronous transmitter, buffer storage means connected between nonsynchronous outputs of said reader and synchronous inputs of said transmitter, a timing source connected to said storage means and said transmitter for synchronously unloading data from said storage means into said transmitter, means providing a pulse for each word of a block, a first counter for counting the number of pulses on a block being read, means connected to said counter for beginning an unloading cycle of said storage means in response to a predetermined count of said first counter, means providing a pulse for each word synchronously unloaded from said storage means, a second counter for counting the number of pulses in each block being synchronously unloaded, a given pair of counts from said first counter indicating given time positions of each block being unloaded, stop circuit means connected to said reader and said first and second counters, said stop circuit means providing a stop signal to said reader when said predetermined count from said first counter occurs after a first of said pair of counts of said second counter, said stop means having said stop signal terminated by a second of said pair of counts from said second counter.

11. A transmitting system as defined in claim 10, comprising a transmit control means connected to said first and second counters, said transmit control means providing an unload signal to said storage means after said predetermined count of said first counter and a last count of said second counter.

12. A system for bit-synchronously transmitting digital data recorded on tape, said data recorded in blocks of words separated by spacer gaps, comprising a nonsynchronous data tape reader, a reader stop bistable circuit having an output connected to said reader, a synchronous transmitter, a buffer storage device connected between said reader and said transmitter, a synchronous timing source connected to said transmitter, a load pulser connected to inputs of said buffer storage device, and an unload pulser connected to outputs of said storage device, means for loading said buffer storage device in synchronism with an output of said load pulser, means for unloading said buffer storage device in synchronism with said timing source, a load counter connected to said load pulser for counting the words in each block being read, an unload counter connected to said unload pulser for counting the words in each block being synchronously unloaded, said load counter providing at least first and second outputs at predetermined counts near the beginning and at the end of a block being read, said unload counter providing at least first and second outputs for different predetermined counts, a gate having inputs connected to the second output of said load counter and the first output of said unload counter, an output of said gate being connected to said stop bistable circuit to trigger its output to stop the reading operation of said reader, the second output of said unload counter being connected to another input of said stop bistable circuit to reset it to permit normal operation of said reader.

13. A transmitting system as defined in claim 12, comprising longitudinal parity generating means connected between said reader and said buffer storage device, said load pulser output being connected to said parity generating means to provide the timing of each block being read, error-signal receiver means for receiving an error signal from an opposite terminal receiving said transmitted data, reader reversing means connected to said reader to control its direction of movement, means connecting said error signal receiver means to an input of said reader reversing means to trigger it in response to a received error signal to reverse said reader to a position in a spacer gap prior to the erroneously transmitted block, a means for triggering said receiver reversing means to drive said reader in a forward direction when it has reached said prior spacer gap.

14. A system, as defined in claim 13, in which a third output is provided from said load counter corresponding to the first word of each block, said third output being connected to said unload counter for resetting it, an "Or" gate having inputs connected to the second output of said unload counter and the output of said error signal receiver means, and an output of said "Or" circuit being connected to said load counter to reset it.

15. A transmitting system, as defined in claim 13, in which said load counter provides a third output corresponding to a count shortly before the highest count of a block, a delayer having an input connected to the third output of said load counter and providing a delay that terminates after a block being read, and an input of said reader reversing means being connected to an output of said delayer for triggering it to operate said reader in a forward direction.

16. A system for bit-synchronously communicating digital data magnetically recorded on tape, said data recorded in blocks of words separated by spacer gaps, comprising a nonsynchronous data tape reader, a reader stop bistable circuit having an output connected to said reader, a synchronous transmitter, a buffer storage device connected between said reader and said transmitter, a synchronous timing source connected to said transmitter, a load pulser connected to inputs of said buffer storage device, and an unload pulser connected to outputs of said storage device, means for loading said storage device in synchronism with an output of said load pulser, means for unloading said storage device in synchronism with said timing source, a load counter connected to said load pulser for counting the words in each block being read, an unload counter connected to said unload pulser for counting the words in each block being synchronously unloaded, said load counter providing at least first and second outputs at predetermined counts after the beginning and near ending of each block being read, said unload counter providing at least first and second outputs near and at the end of a block being unloaded, the second output of said unload counter being connected to said load counter to reset it, said load counter providing its second output until reset, gate means having inputs connected to the second output of said load counter and the first output of said unload counter, an output of said gate means being connected to said reader stop bistable circuit to interrupt the reading operating of said reader, the second output of said unload counter being connected to said reader stop bistable circuit to restore a forward operating signal to said reader, a control bistable circuit for starting and stopping the unloading operation of said buffer storage device to said transmitter, the first output of said load counter being connected to said control bistable circuit to trigger it to start an unloading operation, after the first count the second output of said unload counter being connected to said control bistable circuit to trigger the end of an unloading operation, a synchronous receiver receiving the output of said transmitter, and a digital tape writer recording the receiver output.

17. A receiving system for a bit-synchronous communication system having automatic error correction, wherein data is sent as blocks of words, comprising a synchronous receiver, a data tape writer, means connecting said receiver to said writer, parity comparator means connected to an output of said receiver, a pulser connected to an output of said receiver to provide a pulse for each received word, a receiver word counter connected to the output of said pulser and providing at least one output timed with the end of each received block, said counter output connected to said parity comparator means to provide timing of received parity information, writer reversing means connected to said writer to control its direction of movement, a reverse triggering input of said reversing means, first means connected an output of said parity comparator to said reverse triggering input, an error signal coder connected to said first connecting means, a transmitter connected to said error signal coder, a forward triggering input of said reversing means, and second means connecting said counter to said forward input to trigger said reversing means to operate said writer in a normal forward direction.

18. A system, as defined in claim 17, in which a second output of said counter is provided for a count prior to the last count of a block, delaying means connected to said second output to provide a delay into the following spacer gap, an "and" gate having inputs connected to outputs of said delaying means and said parity comparator means, an output of said "and" gate connected to said reverse triggering input and to said error signal coder, and the output of said delaying means connected to said forward triggering input.

19. A system, as defined in claim 18, in which the output of said delaying means is connected to a reset input of said counter.

References Cited in the file of this patent
UNITED STATES PATENTS

| | | |
|---|---|---|
| 2,706,215 | Van Duuren | Apr. 12, 1955 |
| 2,782,398 | West | Feb. 19, 1957 |
| 2,921,296 | Floros | Jan. 12, 1960 |
| 2,978,541 | Steeneck et al. | Apr. 4, 1961 |

OTHER REFERENCES

Book, Faster, Faster, by W. J. Eckert and Rebecca Jones, McGraw-Hill Book Co., Inc., 1955 (page 100 relied upon).